(12) United States Patent
Hills et al.

(10) Patent No.: US 7,943,058 B2
(45) Date of Patent: May 17, 2011

(54) TAGGED SCALE INHIBITING POLYMERS, COMPOSITIONS COMPRISED THEREOF AND PREVENTING OR CONTROLLING SCALE FORMATION THEREWITH

(75) Inventors: Emma Hills, Leeds (GB); Pascal Chapon, Toulouse (FR)

(73) Assignee: Rhodia Chimie, Boulogne-Billancourt Cedex (FR)

( * ) Notice: Subject to any disclaimer, the term of this patent is extended or adjusted under 35 U.S.C. 154(b) by 1313 days.

(21) Appl. No.: 10/562,052

(22) PCT Filed: Jun. 25, 2004

(86) PCT No.: PCT/EP2004/006977
§ 371 (c)(1),
(2), (4) Date: Apr. 28, 2006

(87) PCT Pub. No.: WO2005/000747
PCT Pub. Date: Jan. 6, 2005

(65) Prior Publication Data
US 2007/0125987 A1    Jun. 7, 2007

Related U.S. Application Data

(60) Provisional application No. 60/482,271, filed on Jun. 25, 2003, provisional application No. 60/482,257, filed on Jun. 25, 2003.

(51) Int. Cl.
*C02F 5/08*    (2006.01)
(52) U.S. Cl. ......... 252/175; 210/696; 507/237; 166/279

(58) Field of Classification Search ........... 210/696, 210/699, 701; 507/237; 252/175, 180; 166/279, 166/310
See application file for complete search history.

(56) References Cited

U.S. PATENT DOCUMENTS

| 6,129,906 | A | 10/2000 | Steventon |
| 6,312,644 | B1 | 11/2001 | Moriarty et al. |
| 2004/0170657 | A1 | 9/2004 | Morvan et al. |
| 2004/0213854 | A1 | 10/2004 | Taisne et al. |

FOREIGN PATENT DOCUMENTS

| WO | WO 01/81654 A13 | 11/2001 |
| WO | WO-03/002242 A1 | 1/2003 |
| WO | WO-03/006148 A1 | 1/2003 |

OTHER PUBLICATIONS

International Search Report dated Jun. 7, 2006.
International Serach Report corresponding to PCT/EP 2004/006977, issued on Mar. 17, 2005, 2 page.

*Primary Examiner* — Sean E Conley
(74) *Attorney, Agent, or Firm* — Buchanan Ingersoll & Rooney, P.C.

(57) ABSTRACT

Tagged scale-inhibiting polymers, compositions comprised thereof and preventing or controlling scale formation therewith, the tagging units being units deriving from a monomer having the formula $X_2C=CYY'$ wherein X is a hydrogen atom, or a $C_1$-$C_4$ alkyl radical, Y is a hydrogen atom or a $C_1$-$C_4$ alkyl radical, Y' is a radical having formula -L-Arom, wherein L is a covalent bond or a divalent organic linking group optionally comprising heteroatoms, and Arom is a group comprising at least two conjugated aromatic rings, said rings comprising conjugated carbon atoms, and, linked to said carbon atoms, hydrogen atoms or other substituents.

17 Claims, 7 Drawing Sheets

TAGGED SCALE INHIBITING POLYMERS, COMPOSITIONS COMPRISED THEREOF AND PREVENTING OR CONTROLLING SCALE FORMATION THEREWITH

This application claims priority under 35 U.S.C. §119 of provisional application Ser. Nos. 60/482,271, filed Jun. 25, 2003 and 60/482,257, filed Jun. 25, 2003, and is the National Phase of PCT/EP 2004/006977, filed Jun. 25, 2004 and designating the United States, published on Jan. 6, 2005 as WO 2005/000747 A3, each hereby expressly incorporated by reference and each assigned to the assignee hereof.

BACKGROUND OF THE INVENTION

The invention relates to tagged scale-inhibiting polymers, to compositions comprising said polymers, and to a method for preventing or controlling scale formation in systems comprising said fluids.

Scale formation is a problem to be addressed in most water containing systems. Scale formation can occur when the physical environment of the water changes to result in the solubility limit of certain compounds being exceeded. For example, changes to the pH, temperature, pressure or composition of the water can all result in the deposition of scale. The most problematic scales are metal sulfates and carbonates, especially Barium sulfates in oilfield production. Scale formation can cause many problems, for example it can impair heat-transfer in boilers and condensers, and may block pipe-work. In oil recovery and, more importantly, in secondary oil recovery (where water is injected into an oil well in order to displace the crude oil and repressurize the formation), scale formation may cause blockage of pipe work and the pores in the oil-bearing strata, thus reducing or even preventing the flow of oil.

In order to address scale formation, scale-inhibiting chemicals, for example polymers, phosphonates, polyphosphates are known. Treatment levels vary from system to system and typically range from less than 1 ppm up to several hundreds of ppm. Scale inhibiting chemicals are used in a wide range of water utilizing industrial applications, for example, oil industry applications, including secondary oil production, cooling towers, boilers, thermal desalination plants, membrane separation processes, mineral ore extraction, paper pulping, paper manufacture and geothermal power production facilities, to name but a few.

In most of these applications, the scale inhibiting chemical can be dosed directly into the system using a simple chemical dosing system. For secondary oil recovery, the scale-inhibiting chemical can be applied to oil bearing formations by means of "squeeze treatment". Squeeze treatment involves pumping scale inhibitor into an oil production well so that the inhibitor enters the formation rock and is retained there. When the well is put back into production, the produced fluids are treated by the scale inhibitor which leaches out of the formation rock. Thus the scale inhibitor is released in the fluid displacing the oil. The scale inhibitor may be applied in an aqueous or non-aqueous medium, as a solution, an emulsion or as an encapsulated product. The scale inhibiting chemical can also be used in topside oilfield processes.

The objective is to prevent or control the scale formation in systems wherein the fluid is used.

Scale formation is only controlled if the scale inhibiting chemical is present at a treatment level within the product's defined effective range. However, most water systems needing scale control treatment have liquid losses which remove treated water from the system. Also, scale inhibitor may be lost through, for example by adsorption or degradation. Hence, there is a need to replenish the scale inhibitor to replace this loss. Additionally, with squeeze treatment, the concentration of the scale inhibitor in the produced fluids will diminish over time till a repeat "re-squeeze" operation is necessary. The consequences of scaling is often catastrophic in this application and so it is most important to avoid scale. Overall, it can be seen that the concentration of scale inhibitor in the treated fluids is very important and chemical analysis of scale control chemicals, particularly polymers, has always been difficult at ppm levels. The problem of analysis has recently become more important in subsea tiebacks used in oil production, because, typically, subsea completions utilize several individual wells where the fluids flowing from these wells are combined on the seabed and the combined fluids are piped to the nearest production platform which may be several tens of miles away. In this case it would be necessary to treat the individual wells with scale control chemicals which can be individually analyzed.

Hence, a good analytical method for the scale inhibitor chemical is required for at least one of the following reasons:
  To ensure that the concentration of scale inhibitor chemical does riot fall outside of the effective range,
  To help optimize dose rates, and/or
  To avoid stopping the production for re-squeezing whereas it was not actually needed.

As measuring the concentration of scale inhibitor chemicals, particularly polymers, is difficult because of the low concentration (up to a few hundred ppm), it has been suggested to use tagged, or "labeled" polymers, having groups that are easily detectable. Numerous references teach of the generation of tagged scale-inhibiting polymers, and methods for measuring the amount thereof.

Reference EP 157465 describes a copolymer comprising a group to be reacted with a diazonium salt for measuring the amount thereof by colorimetry.

Reference WO 01/44403 describes a copolymer comprising a pyrene-derived group, for measuring the amount thereof by fluorometry.

The invention concerns other tagged polymers that have advantages over the prior art. The polymers are especially suitable for use in oil recovery systems, but are also applicable for use in any water utilizing system where detection of scale control additives would be beneficial, for example boilers, cooling towers, mineral ore extraction paper pulping, paper manufacture, geothermal power production facilities, membrane separation processes and thermal desalination plants. The tags and the tagged polymers have a good resistance to salts (brine) and temperature. They are detectable even in the presence of compounds that are comprised in the fluid, such as antioxidants, or non recovered oil.

BRIEF SUMMARY OF THE INVENTION

The invention relates to a tagged scale-inhibiting polymer comprising scale inhibiting units and tagging units, wherein the tagging units are units deriving from a monomer having the following formula:

wherein:
  X, which is identical or different, is a hydrogen atom, or a $C_1$-$C_4$ alkyl group,
  Y, is a hydrogen atom or a $C_1$-$C_4$ alkyl group,
  Y' is a group having formula -L-Arom, wherein
    L is a covalent bound or a divalent organic linking group optionally comprising heteroatoms, and Arom is a group comprising at least two conjugated aromatic rings, preferably at least three, said rings comprising conjugated carbon atoms, and optionally nitrogen or oxygen atoms, and, linked to said carbon atoms, hydrogen atoms or substituents.

In another aspect, the invention relates to compositions, for example fluids, comprising the tagged scale-inhibiting copolymer, such as industrial water fluids or oil-recovery fluids or squeeze treatment compositions, for example squeezing fluids, and to the use of the tagged scale-inhibiting polymer in said compositions, for example in fluids or squeeze treatment products. By industrial water fluids it is referred to for example, fluids in cooling water systems, particularly cooling towers, boiler water, fluids in thermal desalination plants, fluids in membrane separation processes, fluids in geothermal power production, fluids in mineral ore extraction, fluids in paper pulping and manufacture.

In another aspect, the invention relates to a method for preventing or controlling scale formation. The method, especially suitable in systems wherein there is a water or a water-based fluid circulation, comprises the steps of:
- adding in the fluid a scale-inhibiting amount of a tagged scale-inhibiting polymer, or forcing, for example by a squeeze treatment, a tagged scale-inhibiting polymer into an oilfield wherein the fluid will be circulated,
- periodically, continually, or continuously measuring the amount of tags in the fluid, and
- periodically, continually, or continuously further adding some more tagged scale-inhibiting copolymer when the measured amount is below a given value, and/or re-forcing the tagged scale inhibiting polymer into the oilfield.

The invention also relates to the use of the scale-inhibiting polymer for preventing or controlling scale formation.

Application areas for this invention include a wide variety of water using equipment or destinations; for example, steam or hot water boilers, paper pulping and manufacture, cooling systems, such as cooling towers, desalination plants (thermal or reverse osmosis), geothermal equipment, membrane separations, mineral ore extraction. Application areas also include oil recovery, preferably secondary oil recovery, and oil production equipment. Types of scale encountered in these applications include carbonates, for example calcium, magnesium or strontium carbonate, sulfates, for example barium sulfate and strontium sulfate, calcium sulfates, oxalates, for example calcium oxalate, phosphates, for example calcium phosphate, fluorides, sulfides, silica and silicates, naphtlenates, for example calcium naphtlenate.

The scale inhibiting polymers according to the invention may also have dispersant properties which are useful for controlling fouling by particulate matter. Also, they may be applied to clay slips, used in the ceramic industry to improve rheology and handleability. The polymers are also useful for controlling corrosion, for example ferrous metal corrosion.

The scale inhibiting polymers may be used on their own or in combination with other water treatment chemicals or other production additives such as scale and corrosion inhibitors, dispersants, oxygen scavengers, biocides, flocculents, hydrate inhibitors, asphaltene inhibitors, biocides, surfactants, demulsifiers. Fluids comprising the tagged-scale inhibiting polymers according to the invention may also comprise other impurities such as residual organics, iron, divalent cations, chloride. The tagged scale inhibiting polymers are detectable in the presence of these impurities.

DETAILED DESCRIPTION OF THE INVENTION

Definitions

By polymer it is meant a macromolecular chain comprising repeating units. By copolymer, it is meant polymers comprising repeating units, and having at least two different units. Copolymers include polymers having two different repeating units, three different repeating units (sometimes referred to as ter-polymers) or more.

"MIC" refers to a minimum inhibitor concentration. The MIC can be evaluated according to a static jar test as described in NACS Standard TM 0197-97, *Laboratory Screening test to Determine the Ability of Scale Inhibitors to prevent the precipitation of barium Sulfate and/or Strontium Sulfate from Solution (for Oil and Gas Production Systems)*, Item No. 21228, NACE International, 1997.

Tagged Scale-Inhibiting Copolymer

The tagged scale inhibiting polymer according to the invention comprises at least two different units: scale-inhibiting units and tagging units. As the polymer comprises at least these two different units, the polymer can be also referred to as a copolymer. For example the scale inhibiting units prevent scale-formation. The tagging units are detectable by an analysis method. It is not excluded that the tagging units also prevent scale formation. It is not excluded that the scale-inhibiting units also be detectable.

The polymers according to the invention are obtained by polymerizing monomers.

Any polymerization method can be used to prepare the polymers. Free-radical polymerization methods are preferred. Suitable methods include aqueous bulk/dispersion polymerization, solution polymerization, or emulsion polymerization. The preferred polymerization process is solution polymerization. According to such a process water is charged to a reaction vessel fitted with a mechanical stirrer and water condenser and heated to 90° C. To this may be added polymerization initiators or these may be fed in later. The 'tagged' monomer may also be added to this charge, added to the polymer feed or fed in separately. A monomer feed(s), soluble initiator feed and optionally a chain transfer reagent feed are added to the vessel over 6 hours. Post polymerization neutralization to the required level is carried out with a suitable salt. These processes and methods are known by the one skilled in the art.

Tagging Units

The tagging units of the polymer according to the invention are selected from the group consisting of:
units deriving from a monomer having the following formula:

$$X_2C=CYY',$$

wherein:
- X, which is identical or different, is a hydrogen atom, or a $C_1$-$C_4$ alkyl group,
- Y, is a hydrogen atom or a $C_1$-$C_4$ alkyl group,
- Y' is a group having formula -L-Arom, wherein
  - L is a covalent bound or a divalent organic linking group optionally comprising heteroatoms, and
  - Arom is a group comprising at least two conjugated aromatic rings, preferably at least three, said rings comprising conjugated carbon atoms, and optionally nitrogen or oxygen atoms, and, linked to said carbon atoms, hydrogen atoms or substituents.

Arom is preferably a group having at least 10 conjugated carbon atoms, preferably at least 14 carbon atoms in at least three conjugated aromatic rings.

The conjugated aromatic rings are preferably $C_5$ or $C_6$ rings.

Arom is advantageously a group having a naphtalene, an anthracene, a pyrene or a phenanthrene moiety, said moiety having optionally substituents.

L is preferably a covalent bound or a divalent $C_1$-$C_{12}$ alkyl group, or a group having formula —O—, —CO—O—, CO—NH—, or —O—CO—.

Especially preferred tagging units are units deriving from vinyl-anthracene, preferably from 9-anthracene.

9-vinyl anthracene (9-VA)

Other units include units deriving from α-vinyinaphtalene, 1-vinylpyrene, 4-vinyl-9,10-diphenylanthracene, 3-vinylphenanthrene, 9-vinylacridine.

The tagging units can be detected by any method appropriate, such as Fluorometry, for example using a fixed wavelength fluorometer. Usually, detection is at the polymer maxima excitation (ex) and emission (em) wavelengths. These can be determined using a scanning fluorometer in scanning mode. It is considered that the level of fluorescence is determined by the Beer-Lambert Law. Polymer concentrations are thus assigned by comparison of the emission intensity of the polymer sample with a calibration plot obtained from polymer samples of a known concentration.

The table below shows examples of wavelengths for some polymers.

| Co-polymer | Excitation wavelength (nm) | Emission wavelength (nm) |
| --- | --- | --- |
| AA* - 0.1 mole % 9-vinyl anthracene co-polymer | 260 | 410 |
| AA* - 0.05 mole % 9-vinyl anthracene co-polymer | 260 | 410 |
| AA* - 0.01 mole % 9-vinyl anthracene co-polymer | 300 | 380 |

*Acrylic Acid

Scale-Inhibiting Units

The scale-inhibiting units are preferably selected from the group consisting of:
vinyl sulfonic acid, or vinyl sulfonates salts,
vinyl phosphonic acid, or vinyl phosphonates salts,
vinylidene diphosphonic acid, or salts thereof,
acrylic acid,
methacrylic acid,
vinyl acetate,
vinyl alcohol,
unsaturated mono or di carboxylic acids or anhydrides different, such as maleic anhydride, maleic acid, fumaric acid, itaconic acid, aconitic acid, mesaconic acid, citraconic acid, crotonic acid isocrotonic acid, angelic acid, tiglic acid,
vinyl chloride,
styrene-p-sulfonic acid, or styrene sulfonates salts,
acrylamido-2-methylpropanesulfonic acid (AMPS),
hydroxyphosphonoacetic acid (HPA),
hypophosphorus acids such as $H_3PO_3$, giving units of formula —PO(OH)—,
acrylamides,
propargyl alcohol having formula $HC\equiv C-CH_2-OH$,
butyr-1,4-diol, and
mixtures thereof.

It is mentioned that monomers incorporating a hydroxyl group (for example HPA or vinyl alcohol) may aid adsorption to barium sulfate crystals, alcohol group giving good adsorption to crystal active growth sites, effectively blocking them, useful for high Ca brines, which inactivate other acidic functional groups. Monomers incorporating an amine group may aid adsorption to calcium carbonate crystals. Other sulfonated monomers (for example AMPS or vinyl sulfonic acid or sulfonates salts) may aid brine compatibility.

Other Units (Other Function)

While the above-mentioned units are usually comprised in the polymer backbone, it is mentioned the copolymer may comprise other units and/or other groups. The other groups include groups that are linked to at least one polymer end. These groups can result from a polymerization initiator or can be end-capping groups. They might have no particular function, or might constitute scale-inhibiting groups, tagging groups, or groups helping in formulating the inhibitor, or other.

Thus, other groups or units include groups or units having formula $X''_2O_3P-CHY''CZ''_2PO_2X''-$, wherein X'' is H or an alkali metal, alkaline earth or other polyvalent metal, ammonium or an organic base, groups, Y'' and each Z'', which may be the same or different, are each hydrogen, a $PO_3X_2$, $SO_3X$ or $CO_2X$ group or an alkyl or aryl moiety. Examples are units deriving from an of adduct of vinylphosphonic acid (VPA) or vinylidene-1,1-di-phosphonic acid (VDPA) and hypophosphorus acid or a salt thereof. Such groups or units are describes in document EP 861846. Other possible groups or units are described in GB 1458235. These other groups or units can help in detecting the polymer, and/or in having a scale-inhibiting effect.

Styrene sulfonic acid, styrene sulfonates, 4-vinyl benzene sulfonic acid or 4-vinyl benzene sulfonates can help in controlling desorption of the scale inhibiting polymer in so called squeeze treatments, particularly at high temperature and/or high pressure.

Molecular Weight Data and Other Parameters

The polymer according to the invention has preferably a weight-average molecular weight of from 500 to 20000 g/mol, and more preferably of from 1000 to 8000 g/mol. The weight-average molecular weight of the polymer, or copolymer, can be measured by size exclusion chromatography/gel permeation chromatography (GPC). Size exclusion chromatography requires passing a polymer down a GPC packed chromatography column. The pore size in the column is adapted to a specific polymer molar mass range. As the polymer elutes through the column the smaller polymer chains pass into the pores and hence the longer polymer chains are eluted first. Eluted polymer can be detected by a range of detectors including; differential refractive index, ultra-violet, infra-red and exaporative light scattering. The analysis gives the molar mass spread of a polymer sample. Specific statistical molar mass averages (Mw, Mn, Mz) are obtained by comparison of elution times with specialist standard polymers of a low molar mass spread and known molar mass.

Where the scale inhibiting units are polyacrylic acid units, the weight average molecular weight is preferably of from 2000 to 7000 g/mol.

It is further mentioned that the copolymer according to the invention can be supplied in an acid form or neutralized to give a (partly) neutralized salt. Supply pH is determined by a range of factors, including the mineralogy of the formation for a squeeze chemical.

Amounts of Tagging Units within the Polymer

The polymer according to the invention comprises an effective detection amount of the tagging units. For example, for the tagging units the copolymer can have a molar amount of tagging units of up to 5%, but advantageously of from 0.01 to 0.2%.

Compositions—Fluids

The scale-inhibiting polymer is usually introduced in a composition, for example in a fluid. According to one embodiment, the fluid is comprised in or intended for industrial water systems or process systems. Examples of industrial water systems include boilers, cooling systems for example in industrial or chemical processes, such as cooling towers, desalination plants (thermal or membrane based), geothermal power production, irrigation systems, mineral ore extraction systems, paper pulping or manufacturing systems, membrane separation systems.

In another embodiment, the fluid is used in the oil industry, where it can be used to treat water injection systems, subsea flow lines, topside production equipment and, most preferably be used "down-hole" to control scaling in and around the production wellbore. Possible down-hole deployment methods for the scale inhibitor include: continuous injection, deployment via gas lift, squeeze treatments, coiled tubing.

It can be used for squeeze treatment techniques and also be applied via Macaroni strings. It can also be placed in the rat hole at the bottom of the well. If a squeeze treatment is used, a fluid comprising the scale-inhibiting polymer is understood either as a fluid used to force the scale-inhibiting polymer into a well or an formation rock, or a fluid wherein said scale-inhibiting polymer has been released.

Down-hole chemical deployment is routinely and effectively effected by squeeze treatments, which protect both the production well-bore and near well-bore formation out to a radius of around 20 feet. This batch technique involves deferring oil production while chemical is pumped down the production well and into the formation, shutting in the well to allow the chemical to interact with the formation rock, then recommencing production. The chemical is slowly released from the rock, returning to the surface in produced fluids. Protection from scaling requires inhibitor levels in produced fluids to be above MIC. With high inhibitor-to-formation adsorption slow returns are seen at lower concentrations (adsorption must be optimised giving the required MIC). These returns protect greater volumes of produced fluids, extending squeeze lifetime The squeeze is repeated when inhibitor levels in produced fluids approach MIC.

The major aim a 'tagged' polymeric inhibitor is to insure against scaling in large investment, sub-sea complex developments. However the costs of squeeze treatments in these wells is huge, mainly due to deferred oil and access costs. By comparison the inhibitor chemical costs are minor. So any reduction in squeeze intervals in these wells, due to better inhibitor analysis from different wells, would be a clear cost saving. In addition several functional groups encourage adsorption to the formation rock and it is surmised that a subsidiary consequence of incorporating a hydrophobic 'tag' into polymers may be increased inhibitor formation adsorption.

The main stages of squeeze operations can include the following:

(i) pre-flush: This consists of a dilute solution of inhibitor in seawater often containing a surfactant or demulsifier. It is intended to cool the formation, so reducing near-well bore adsorption and propagating inhibitor further into the formation. Of equal importance is the displacement of formation water and creation of a buffer zone to avoid any incompatibilities with the high concentrations of inhibitor injected, especially when high salinity/high calcium ion formation waters are involved. The pre-flush may also remove residual surface oil to increase water wetness.

(ii) inhibitor injection: The main inhibitor treatment is typically 5-10% active inhibitor in seawater. Modelling both the maximum inhibitor adsorption (from the isotherm, obtained either from core floods or more accurately from history matching) and the surface area available for adsorption identifies optimum inhibitor concentrations and volumes to maximise squeeze lifetime without the injection of surplus chemical.

(iii) over-flush: The majority of the fluid volume is injected at this stage. The fluid is designed to flush the inhibitor slug further into the formation to a radial distance of 8 to 15 feet. This increases the surface area of rock the inhibitor encounters and increases adsorption levels. It also displaces inhibitor from the cooled near well-bore into the hotter formation where greater adsorption takes place. Modelling the injected volume balances increased squeeze lifetime with lifting demands on recommencing production and the potential to change the wettability of the formation. There is also a risk that the inhibitor will returns at levels below MIC if injected too far into the formation.

(iv) 'shut-in': The well is left to allow the inhibitor to adsorb to the rock. Shut in times are typically 6 to 12 hours, depending on the length of time needed for inhibitor adsorption to reach equilibrium. At higher temperature adsorption rates are higher and shut-in periods can be reduced. Modelling balances the level of adsorbed inhibitor against deferred oil costs.

(iv) back production: Production is recommenced in the original direction of flow. The inhibitor desorbs from the formation rock and returns to the surface in the produced fluids.

The fluids are preferably water-based fluids, usually seawater-based fluids, but other fluids are not excluded. For example glycol or glycol ether based solvents can be used. Some useful formulations of fluids for squeeze treatments are provided in document WO 98/30783.

The polymer according to the invention may be used in combination with one another, and/or in conjunction with other water treatment agents including: surfactants, such as anionic surfactants (eg. C10-20 alkyl benzene sulfonates, C10-20 olefin sulfonates, C10-20 alkyl sulfates, C10-20 alkyl 1 to 25 mole ether sulfates, C10-20 parafin sulfonates, C10-20 soaps, C10-20 alkyl phenol sulfates, sulfosuccinates, sulfosuccinamates, lignin sulfonates, fatty ester sulfonates, C10-20 alkyl phenyl ether sulfates, C10-20 alkyl ethanolamide sulfates, C10-20 alpha sulfo fatty acid salts, C10-20 acyl sarcosinates, isethionates, C10-20 acyl taurides, C10-20 alkyl hydrogen phosphates), non-ionic surfactants (eg. ethoxylated and/or propoxylated C10-20 alcohols, ethoxylated and/or propoxylated C10-20 carboxylic acids, alkanolamides, amine oxides, and/or C10-20 acyl sorbitan and/or glyceryl ethoxylates) amphoteric surfactants (eg. betaines, sulfobetaines, and/or quaterised imidazolines), and/or cationic surfactants (eg. benzalkonium salts, C10-20 alkyl trimethyl ammonium salts, and/or C10-20 alkyl trimethyl); sequestrants, chelating agents, corrosion inhibitors and/or other threshold agents (eg. polymers such as aminometholine phosphonate polymers, polyacrylic acid, or non polymeric agents such as sodium tripolyphosphate, sodium ethylenediamine tetracetate, sodium nitrilo triacetate, tetra potassium pyrophosphate, acetodiphosphonic acid and its salts, ammonium trismethylene phosphonic acid and its salts, ethylenediamine tetrakis (methylene phosphonic) acid and its salts, diethylenetriamine pentakis (methylene phosphonic) acid and its salts); tolyltriazole and mixtures of nitrate, benzqate, HHP and/or PTCB) biocides (eg. tetrakis (hydroxymethyl) phosphonium salts, formaldehyde, glutaraldehyde, DENPA, bromopol isothiazoronal); oxidising biocides and/or bleaches (eg. chlorine, chlorine dioxide, hydrogen peroxide, sodium perborate); foam controlling agents such as silicone antifoams; oxygen scavengers such as hydrazines and/or hydroxylamines; pH controlling and/or buffering agents such as amines, borates, citrates and/or acetates; chromium salts; zinc salts; and/or other water treatment agents such as polymeric dispersants and coagulants including polymaleic, polyacrylic and polyvinylsulfonic acids and their salts, starches and/or carboxy methyl cellulose, and/or molybdates. The invention provides formulations comprising an effective amount of a product of the invention as aforesaid and any of the aforesaid known water treatment-agents. Such formulations may, for example, contain from 5 to 95% by weight of a product of the invention and from 5 to 90% by weight of one or more of any of the aforesaid water treatment agents.

More particularly, the fluid may further comprise additives chosen from the following:
- corrosion inhibitors (imidazoline and quaterantry ammonium salts)
- hydrate inhibitors (such as methanol) and cinetic inhibitors such as anti-agglomeration agents,
- asphaltene inhibitors
- wax inhibitors
- biocides (such as THPS, for example marketed by Rhodia as Tolcide® PS)
- demulsifiers
- surfactants,
- other scale inhibitors.

Water flooding is a commonly used technique in oil recovery operations. Water is injected under pressure into the formation water reservoir via injection wells; this procedure drives the oil through the mineral deposits and rock formations into the production wells. Sea water, readily available in offshore operations, and typically used for the injection water in the water flooding operation, contains large amounts of dissolved salts, such as sulfates. Interaction of the injection water (in the absence of effective scale inhibitors) with the formation water in the reservoir will produce unwanted inorganic deposits (primarily scale-forming salts of calcium sulfate, barium sulfate and strontium sulfate) which ultimately block tubing, valves and pumps of the oil recovery process equipment, Additional conditions that aggravate the deposition of scale-forming salts include pressure, high temperatures and high concentrations of barium, strontium, calcium or iron ions encountered in typical oil recovery operations.

In order to address the scale-formation problem, a "squeeze" process is used. Generally, the well is initially preflushed with sea water, then a scale inhibitor-containing injection step is performed; this is followed by an additional sea water feed (over flush step) to distribute the scale inhibitor further into the reservoir to be adsorbed within the mineral deposits and rock formations (matrix of the underground petroleum-bearing formation). During the squeeze treatment, oil recovery operations are curtailed. When oil production operations are resumed, the adsorbed scale inhibitor will be slowly released (desorbed or dissolved) from the formation matrix and prevent the precipitation of scale-forming salts during subsequent oil recovery operations. For oilfields characterized by "harsh" conditions (such as high barium levels or low pH), typical time periods before additional squeeze treatments are required (squeeze lifetime) are 1 to 6 months; desired squeeze lifetimes are 6 to 24 months, preferably 12 to 24 months or longer. The harsher the conditions, the greater the tendency for metal sulfate scale formation with consequent plugging and fouling of the oilfield matrix and oil production equipment.

An aqueous solution of the scale inhibitor can used in the injection step (squeeze treatment); typically the concentration of scale inhibitor is from 0.5 to 20%, and preferably from 2 to 10% by weight of the aqueous solution. When the production water from the oil well begins to show decreased levels of the scale inhibitor further squeeze treatments will be required. Generally, effective scale inhibition will be maintained at levels of inhibitor above the minimum inhibitor concentration (MIC, determine by a static jar test) advantageously above about 25 ppm (in the production water or in the formation water). The more effective the control of the amount of the scale inhibiting polymer, the lower the level can be of scale inhibitor in the production water before requiring additional treatment. The repeat treatment involves injecting additional aqueous solution of the water-soluble polymer into the underground petroleum-bearing formations at time intervals selected to provide amounts of the water-soluble polymer effective to maintain scale inhibition.

For squeeze treatment applications the fluid may be utilized in conjunction with spearhead chemicals, notably surfactants and/or emulsifiers. These chemicals are usually applied before the squeeze inhibitor to aid adsorption onto the rock and to minimize emulsification problems. Useful formulations and procedures are taught in document WO 98/30783.

It is further mentioned the produced water oil recovery fluid may comprise traces of crude oil or of inorganic residues, that have not been completely separated from the produced fluids.

The invention can allow performing continuous off-shore analysis.

Amounts (Polymer)

The amount of polymer being used usually depends on the application. For squeeze treatment applications, the copolymer will typically be applied downhole as a concentrated solution in an appropriate carrier fluid. Typical concentrations of the inhibitor will be 1-50%, more preferably 5-20%. The carrier fluid may be seawater, produced water, aquifer water, membrane treated water, eg desulfated water or mixtures of the above. Alternatively the carrier fluid can be based upon a compatible solvent, for example glycols or glycol ethers, especially in cold environment like in Russia and Canada.

The minimum inhibitor concentration (MIC) will usually vary with water chemistry but will typically be in the range of 1-500 ppm, with the higher values relevant to the more severe scaling environments.

For non-oilfield industrial applications, the product is usually dosed directly into the water stream to give a concentration in the water from between 0.1 to 1000 ppm.

Method for Preventing or Controlling Scale Formation

The invention also relates to a method for preventing or controlling scale formation in systems wherein there is a fluid circulation, preferably a water-based fluid circulation, comprising the steps of:

adding in the fluid a scale-inhibiting amount of a tagged scale-inhibiting polymer, or forcing a tagged scale-inhibiting polymer into an oilfield wherein the fluid will be circulated, periodically, continually, or continuously measuring the amount of tags in the fluid, and periodically, continually, or continuously further adding some more tagged scale-inhibiting copolymer when the measured amount is below a given value, and/or re-forcing the tagged scale inhibiting polymer into the oilfield, wherein the scale-inhibiting copolymer is the tagged scale-inhibiting copolymer.

Examples of systems include:
an industrial water system, for example comprising or having boilers, or process water.
a cooling towers system,
a system comprised in a desalination plant,
a system comprised geothermal power production,
a system comprised in mineral ore extraction,
a system comprised in paper pulping or paper manufacture.

Other examples of systems include systems comprised in oil production wells and near production wellbores, by either squeeze treatment applications, deployment via macaroni strings or placement in a rat hole. The system can be a squeeze treatment system, or a system wherein the scale-inhibiting polymer is introduced In a production fluid displacing oil.

Measuring the amount of tags, and further adding the tagged scale inhibitor polymer, can be advantageously carried out on the fluid after separation from the oil, and before injecting it into the well.

Specific but non-limiting examples of the invention are presented below.

Example 1

Preparation of a Tagged Scale-Inhibiting Copolymer: Co-Polymer of Acrylic Acid (AA) and Vinyl Benzyl Chloride (VBC) Converted to a Co-Polymer of Acrylic Acid (AA) and Rhodamine 6G (R6G)

The synthesis of this polymer was in two steps. The first was a co-polymerisation of M with VBC. A post polymerization nucleophilic substitution reaction across the VBC then attached the Rhodamine 6G fluorescent molecule to the polymer.

A 4-neck, 1 liter, quick-fit round bottomed flask fitted with a mechanical stirrer (Teflon blade) and reflux condenser was charged with 172.5 g of towns water and vinyl benzyl chloride (97%, Aldrich, catalogue number 33,872-9) as indicated in Table 1A. This was heated, with stirring, to 90° C. in a water bath controlled with a thermocouple. Once the vessel contents were at temperature, 238.4 g of the initiator (23% sodium bisulfite solution) and a solution of the chain transfer reagent (CTR), 11.7 g sodium persulfate, dissolved in 31.4 g towns water were co-fed, at a constant rate, into the vessel over 6 hours using a peristaltic and syringe pump respectively. Fifteen minutes after the commencement of the initiator/CTR feeds, 534.8 g of the monomer, acrylic acid, was fed into the vessel, at a constant rate, over 5½ hours (finishing 15 minutes before the initiator/CTR feeds) using a peristaltic pump. Once polymerization was complete the temperature was increased to 98° C. and the vessel contents refluxed for 2 hours. The vessel contents were then cooled. $N_2$ gas was bubbled through the polymer solution for 8 hours to remove residual $SO_2$. This was followed by neutralization to pH=5.1-6.1 with 47% NaOH solution and a solids adjustment to 53.0-55.0% with towns water.

The final polymer physical properties of the AA/VBC co-polymers are shown in Table 1B

TABLE 1A

Level of incorporation of VBC in AA co-polymers

| polymer reference | g of VBC added | mole % VBC | assuming 100% incorporation of VBC and polymer chain Mw = 4 000, No. chloride atoms per polymer chain |
|---|---|---|---|
| 02/16/A | 1.12 | 0.10 | 1 every 18 polymer chains |
| 02/16/B | 0.56 | 0.05 | 1 every 36 polymer chains |
| 02/16/C | 0.11 | 0.01 | 1 every 186 polymer chains |

TABLE 1B

Physical properties of AA/VBC co-polymers

| | Test | | |
|---|---|---|---|
| polymer reference | solids (0.5 g, 130° C., 1 hr, average of 3)/% | Brookfield viscosity (LV3, 30 rpm, 25° C.)/cPs | pH (5%) |
| 02/16/A (acid) | 63.8 | 3120 | 2.89 |
| 02/16/A | 53.7 | 760 | 5.23 |
| 02/16/B (acid) | 65.5 | 4150 | 2.92 |
| 02/16/B | 52.3 | 630 | 5.28 |
| 02/16/C (acid) | 62.5 | 11 860 (LV4) | 2.89 |
| 02/16/C | 53.8 | 2800 | 5.14 |

A 50 g equivalent of polymer, in a 250 ml pyrex beaker, had its pH raised between 8.5 and 9.0 with 47% NaOH. This beaker was then clamped on a hotplate equipped with a thermocouple, which was placed in the beaker, a stainless steel stirrer blade attached to a digital stirrer was also placed in the beaker. While stirring, 50 g of distilled water was added to the mix. Approximately 0.2 g of Rhodamine 6G (99%, Aldrich, catalogue number 25,243-3) was dissolved in ~15 mls ethanol. Rhodamine 6G was in a 0.5/1:1 ratio with VBC as shown in Table 1C. This was also added to the mix under stirring. The temperature of the mix was then brought to 50° C. and left, under stirring, at this temperature for 23 hours. Cling film was placed over the top of the beaker to prevent evaporation. The polymer was then cooled. To remove excess Rhodamine 6G, the polymer was precipitated from 10× its volume of methanol. The precipitated polymer was filtered under gravity through a GF/D glass fibre filter paper placed in a Buchner funnel on a Buchner flask and re-dissolved in distilled water. Precipitation was carried out five times.

TABLE 1C

Ratio of Rhodamine 6G to VBC

| polymer reference | Weight dry (active) polymer/g | Weight of VBC (assuming 100% incorporation)/g | Moles VBC | Weight Rhodamine 6 G/g | Moles Rhodamine 6 G |
|---|---|---|---|---|---|
| 02/16/A | 50.02 | 0.066 | $4.36 \times 10^{-4}$ | 0.2 | $4.17 \times 10^{-4}$ |
| 02/16/C | 50.04 | $7.8 \times 10^{-3}$ | $5.11 \times 10^{-5}$ | 0.02 | $4.20 \times 10^{-5}$ |

Example 2

Preparation of a Tagged Scale-Inhibiting Copolymer: Co-Polymer of Acrylic Acid (AA) and 9-Vinyl Anthracene (9-VA)

A 4-neck, 1 liter, quick-fit round bottomed flask fitted with a mechanical stirrer (Teflon blade) and reflux condenser was charged with 172.5 g of towns water. This was heated, with stirring, to 90° C. in a water bath controlled with a thermocouple. Once the vessel contents were at temperature, 238.4 g of the initiator (23% sodium bisulfite solution) and a solution of the chain transfer reagent (CTR), 11.7 g sodium persulfate, dissolved in 31.4 g towns water were co-fed, at a constant rate, into the vessel over 6 hours using a peristaltic and syringe pump respectively. Fifteen minutes after the commencement of the initiator/CTR feeds, a mixed monomer feed of 534.8 g of acrylic acid and 9-vinyl anthracene (97%, Aldrich, catalogue number V170-8) as indicated in Table 2A was commenced and fed into the vessel, at a constant rate, over 5½ hours (finishing 15 minutes before the initiator/CTR feeds) using a peristaltic pump. Once polymerization was complete the temperature was increased to 98° C. and the vessel contents refluxed for 2 hours. The vessel contents were then cooled. $N_2$ gas was bubbled through the polymer solution for 8 hours to remove residual $SO_2$. This was followed by neutralization to pH=5.1-6.1 with 47% NaOH solution and a solids adjustment to 53.0-55.0% with towns water.

The final polymer physical properties of the AA/9-VA co-polymers are shown in Table 2B.

TABLE 2A

Level of incorporation of 9-VA in AA co-polymers

| polymer reference | g of 9-VA added | mole % 9-VA | assuming 100% incorporation of 9-VA and polymer chain Mw = 4 000, No. chloride atoms per polymer chain |
|---|---|---|---|
| 02/20/A | 1.5 | 0.1 | 1 every 18 polymer chains |
| 02/20/B | 0.75 | 0.05 | 1 every 36 polymer chains |
| 02/20/C | 0.15 | 0.01 | 1 every 183 polymer chains |

TABLE 2B

Physical properties of AA/9-VA co-polymers

| | Test | | |
|---|---|---|---|
| polymer reference | solids (0.5 g, 130° C., 1 hr, average of 3)/% | Brookfield viscosity (LV3, 30 rpm, 25° C.)/cPs | pH (5%) |
| 02/20/A (acid) | 63.8 | 4150 | 3.13 |
| 02/20/A | 54.0 | 5690 (LV4) | 5.25 |
| 02/20/B (acid) | 65.0 | 3840 | 2.86 |
| 02/20/B | 54.3 | 2090 | 5.25 |
| 02/20/C (acid) | 66.5 | — | 2.53 |
| 02/20/C | 49.6 | — | 5.16 |

Example 3

Scale Inhibition Tests

The barium sulfate scale inhibition efficiency of all described polymers was determined using a static jar test method.

All polymers were purified to remove any unreacted monomer (including 'tag' monomer). Purification was by precipitation of the polymer solution from ten times its volume of methanol. The precipitated polymer was recovered by filtration under gravity through a Whatman filter paper Grade GF/D. The purified polymer was redissolved in water. Precipitation was carried out a total of 3 times.

Static jar tests were conducted using a synthetic Forties-type formation water and North Sea seawater according to the brine chemistries in table 3A.

All salts were weighed into a beaker and made up with distilled water to just below 1 liter. The solution was stirred for at least 60 minutes before making up to exactly 1 liter with distilled water. Before use brines were filtered through a 0.45 μm filter under vacuum.

TABLE 3A

Brine compositions

| ion | Forties-type formation water/ppm | North Sea seawater/ppm |
|---|---|---|
| $Na^+$ | 31,275 | 10,890 |
| $Ca^{2+}$ | 2,000 | 428 |
| $Mg^{2+}$ | 739 | 1,368 |
| $K^+$ | 654 | 460 |
| $Ba^{2+}$ | 269 | 0 |
| $Sr^{2+}$ | 771 | 0 |
| $SO_4^{2-}$ | 0 | 2,690 |
| $Cl^-$ | — | 19,972 |

A pH = 5.5 buffer solution was prepared by making up 34 g sodium acetate 3-hydrate and 0.75 g concentrated acetic acid in 250 mls distilled water.

A quench solution was prepared by making up a solution with 3 000 ppm $K^+$ and 1000 ppm polyvinyl sulfonate in distilled water, adjusted to pH=8.0-8.5 with NaOH solution.

Inhibitor stock solutions of 1000 ppm were made up in seawater. These stocks were further diluted to give stocks of 10, 20 and 30 ppm inhibitor, made up in seawater. In duplicate, 100 ml of each of these stocks were placed into a 100 ml plastic bottle. Into 2 bottles were dosed 100 mls of seawater (blanks). Into a further 2 bottles were dosed 100 ml distilled water (controls). All bottles were place in an oven at 90° C. for an hour. An equal number of 250 ml plastic bottles were dosed with 100 ml Forties formation water and 2 mls of buffer solution. These were placed in a pre-heated water bath at 90° C. for an hour. After the hour the seawater bottles were poured into the formation water bottles. All bottles were re-placed in the water bath at 90° C. Bottles were sampled after 2 and 22 hours. 1 ml of supernatant was taken up (taking care not to disturb and precipitated scale) with a 1 ml pipette and added to 9 mls of a pre-prepared quench solution. Barium levels in the samples were determined by inductively coupled plasma spectroscopy (ICP) analysis.

Inhibitor efficiency is expressed as a percent;

$$\% \text{ BaSO}_4 \text{ scale inhibition efficiency} = \frac{\text{Ba}_s^{2+} - \text{Ba}_{min}^{2+}}{\text{Ba}_{max}^{2+} - \text{Ba}_{min}^{2+}}$$

$\text{Ba}_s^{2+}$ = ppm of Ba in sample $\text{Ba}_{min}^{2+}$ = ppm of Ba in (seawater) blank $\text{Ba}_{max}^{2+}$ = ppm of Ba in (distilled water) control Results are given in Table 3B.

TABLE 3B

Inhibitor barium sulfate inhibition efficiencies

| Inhibitor | ppm | % efficiency 2 hours | 22 hours |
|---|---|---|---|
| Poly (acrylic acid) | 5 | 34 | 7 |
|  | 10 | 71 | 21 |
|  | 15 | 87 | 24 |
| Poly (acrylic acid/0.1% VBC) | 5 | 42 | 10 |
|  | 10 | 73 | 24 |
|  | 15 | 83 | 15 |
| Poly (acrylic acid/0.1% 9-vinyl anthracene) | 5 | 30 | 8 |
|  | 10 | 52 | 16 |
|  | 15 | 81 | 26 |

Example 4

Fluorescence Detection Tests

Polymer concentrations are measured and differentiated between 1 and 10 ppm. This is tested through the analysis of purified (precipitation from methanol) bulk polymer. Such analysis is representative of commercial polymers under field conditions. Here unreacted 'tag', present in the supplied polymer, will be lost to the formation. These tests confirm the sensitivity of fluorescent measurements for detection purposes (NB: a 10 ppm polymer solution contains a much lower concentration of 'tag'). They also demonstrate the detectability of two fluorescent 'tags' (9-vinyl anthracene and Rhodamine 6G). Analysis is carried out in distilled water.

Experimental Procedures

Fluorescence analysis requires knowledge of the maximum excitation ($\lambda_{EX}$) and emission ($\lambda_{EM}$) wavelengths for the test chemical. Incorporating 9-vinylanthracene and Rhodamine 6G into a polymer changes their environment and their fluorescence properties. Hence $\lambda_{EX}$ and $\lambda_{EM}$ changes with polymers 'tag' incorporation and molar mass distribution. The maximum $\lambda_{EX}$ and $\lambda_{EM}$ for the five test polymers (purified bulk polymer) are determined using a scanning fluorimeter. The $\lambda_{EX}$ and $\lambda_{EM}$ maxima for the five polymers are shown in Table 4A.

TABLE 4A $\lambda_{EX}$ and $\lambda_{EM}$ maxima for polymers with fluorescent 'tags'

| polymer | Mole % 'tag' incorporation | wavelength/nm $\lambda_{EX}$ | $\lambda_{EM}$ |
|---|---|---|---|
| 02/16/A + Rhodamine 6G | 0.1 | 520.0 | 550.0 |
| 02/16/C + Rhodamine 6G | 0.01 | 520.0 | 550.0 |
| 02/20/A | 0.1 | 260.0 | 410.0 |
| 02/20/B | 0.05 | 260.0 | 410.0 |
| 20/20/C | 0.01 | 300.0 | 380.0 |

Test procedures are those described in the 'Chemical Engineering with Pharmaceutical Chemistry III' Heriot Watt Degree Course, Experiment 14 'Fluorescent Quenching' and FAST Manuel.

Inhibitor stock solutions of 1 000 ppm are made up in distilled water in 100 ml volumetric flasks. These stocks are diluted with distilled water to give 100 mls of a 100 ppm stock using a 10 ml automatic pipette and a 100 ml volumetric flask. Further dilutions in distilled water using 1 ml and 10 ml pipettes give test solutions of; 0.5, 1, 2, 3, 4, 5, 6, 8 and 10 ppm polymer.

The emission intensities for each polymer solution were measured at the excitation and emission wavelengths maxima detailed in table 4A, using a fixed wavelength Perkin-Elmer Fluorescent Spectrophotometer 203. To allow readings on scale the selector and sensitivity were set as appropriate. A cell containing the sample with the maximum emission intensity for each $\lambda_{EX}/\lambda_{EM}$ pair (10 ppm polymer) was placed in the excitation beam and the emission intensity set at 100%. A cell containing the solvent (distilled water) was placed in the excitation beam and the emission intensity set at 0%. No further adjustments of instrument sensitivity settings were made for that $\lambda_{EX}/\lambda_{EM}$ pair. Samples with the same $\lambda_{EX}/\lambda_{EM}$ maxima were placed in the excitation beam and emission intensities measured. For each new $\lambda_{EX}/\lambda_{EM}$ pair the 0%/100% emission absorbance was re-set as above.

Results

Fluorescent measurements are made of test solutions containing 0.5-10 ppm for each of the 5 purified fluorescent 'tagged' polymers. These are compared against measurements for the purified non-fluorescing PAA.

Figure 1:
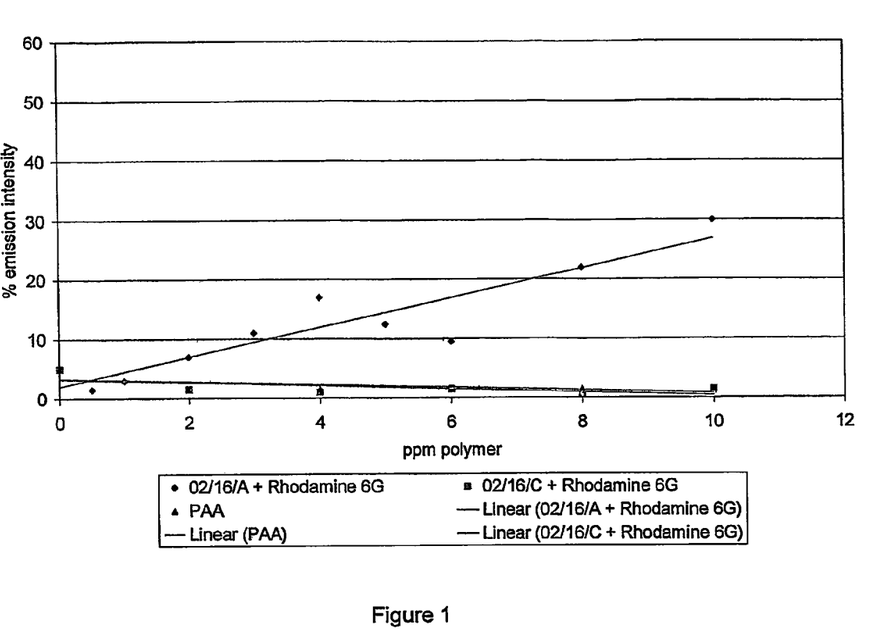

The results for polymers detected at $\lambda_{EX}$=520 nm/$\lambda_{EM}$=550 nm are shown in FIG. 1. These measurements are for the Rhodamine 6G 'tag' at 0.01 and 0.1 mole percent incorporation.

Figure 2:
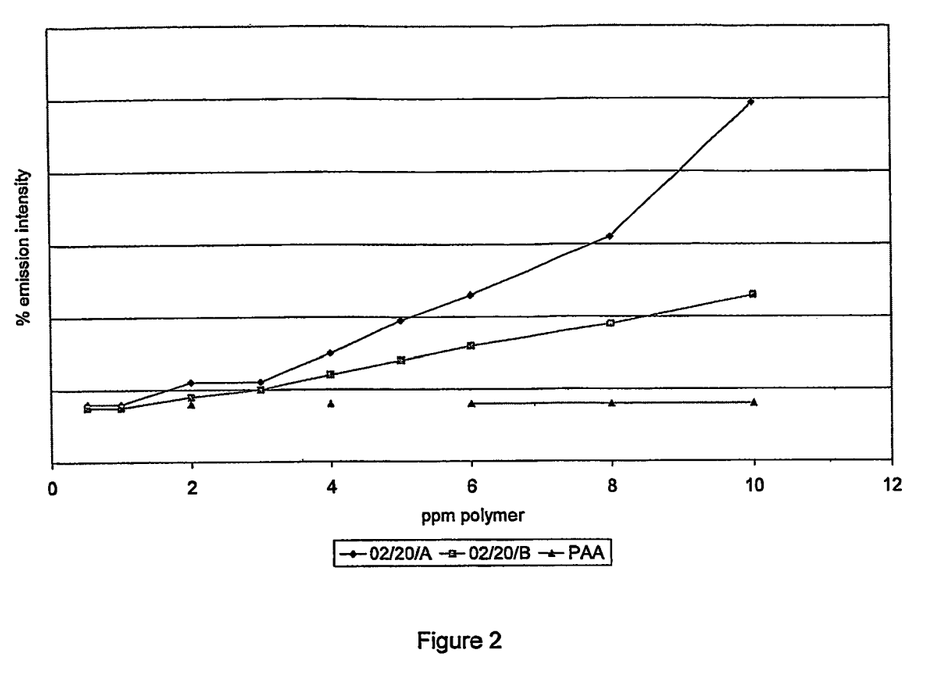

The results for polymers detected at $\lambda_{EX}$=260 nm/$\lambda_{EM}$=410 nm are shown in FIG. 2. These measurements are for the 9-vinyl anthracene 'tag' at 0.1 and 0.05 mole percent incorporation. These results show clearly that both polymers are suitable for accurate polymer detection between 0.5 and 10 ppm.

Figure 3:
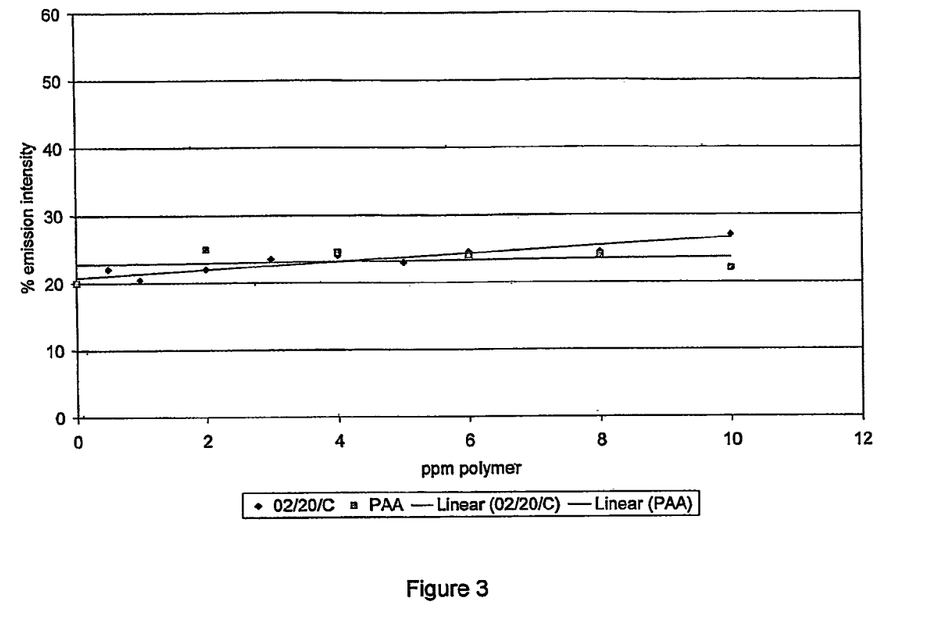

The results for polymers detected at $\lambda_{EX}$=300 nm/$\lambda_{EM}$=380 nm are shown in FIG. 3. These measurements are for the 9-vinyl anthracene 'tag' at 0.01 mole percent incorporation. These results show that the polymer differentiates between 0.5 and 10 ppm polymer.

Example 5

Dynamic Core Flooding Inhibitor Adsorption/Desorption Studies on Clashach Sandstone The adsorption/desorption profiles of polymers with and without a 9-vinylanthracene fluorescent 'tag' to a water-saturated sandstone rock core were determined at a typical field temperature (120° C.). In addition, as 'tagged' polymer returns could be monitored by fluorescence as well as by the standard Hyamine turbidity response, a stable bond between polymer and 'tag' was shown.

Experimental Procedures

Core flooding experiments are an established industry protocol. The rock core selected for this test was outcrop Clashach sandstone quarried near Elgin in Scotland. Core samples were cut and trimmed to 1.5 inch in diameter and 5 inches in length. A test temperature of 120° C. was selected as a typical reservoir temperature. Inhibitor injection was into cooled core at 80° C. again in line with field practice. The test brine selected for these tests was a 50:50 mix of the Forties-type formation water and a sulfate-free version of the seawater from Example 3.

The core floods for both 9-vinylanthracene 'untagged' and 'tagged' polymers were conducted in parallel in the same core flood rig to minimize variations between tests. The dead volumes of both flow systems in the core flood rig were measured. The following procedure was followed for both core flood tests:

Core Preparation and Pre-Treatment

The cores were assembled in Hassler-type core holders with a confining pressure of ~2,000 psi and a line pressure of 180 psi (~12 bar). Both cores were cleaned with mild miscible cleaning by injecting toluene into the core at a flow rate of Q=60 ml/hr for 15 minutes then shutting the core in for 10 minutes at room temperature. This was repeated ¾ times until the effluent was clear and colorless. This cycle was then repeated with methanol.

The cores were saturated with brine by injecting >20 pore volumes of a 50:50 mix of Forties-type FW: SFSW (filtered, degassed and with a pH=5.5) in the forward flow (FF) direction at Q=120 ml/hr. The pore volume of both cores at room temperature was then measured. After this a 50:50 mix of Forties-type FW: SFSW (filtered, degassed and with a pH=5.5) was then injected into the core for >20 pore volumes in the FF direction at Q=120 ml/hr during which time it was heated to the test temperature of 120° C. The core was shut-in overnight. The pretreatment permeabilities to brine at 100% brine saturation were measured. The pore volumes of both cores were then re-measured at 120° C.

Application of Scale Inhibitor

A pre-flush of 3 pore volumes of SFSW was injected into both cores in the reverse flow (RF) direction with Q=60 ml/hr at 120° C. The core was then cooled to the injection temperature of 80° C. After this the main inhibitor treatment at 5% in SFSW was injected into the core for 5 pore volumes in the RF direction with Q=60 ml/hr at 80° C. The differential pressure was monitored continually during the injection stages. The core was then heated to 120° C. and shut-in overnight.

Inhibitor Release and Post Treatment Brine Permeabilities

A 50:50 mix of Forties-type FW: SFSW (filtered, degassed and with a pH=5.5) was injected in the FF direction at Q=60 ml/hr for ~1,000 pore volumes (PV) at 120° C. Effluent samples were collected as follows: 50×5 ml samples (first 10 PV), 146×20 ml samples (next 140 PV) and 2 samples per day for the remainder of the post-flush. The post-treatment brine permeabilities were then measured at 120° C.

The cores were flushed with 100 ml of methanol to displace brine. The core holders were dismantled and the cores sealed in cling film and stored.

Results

Figure 4:
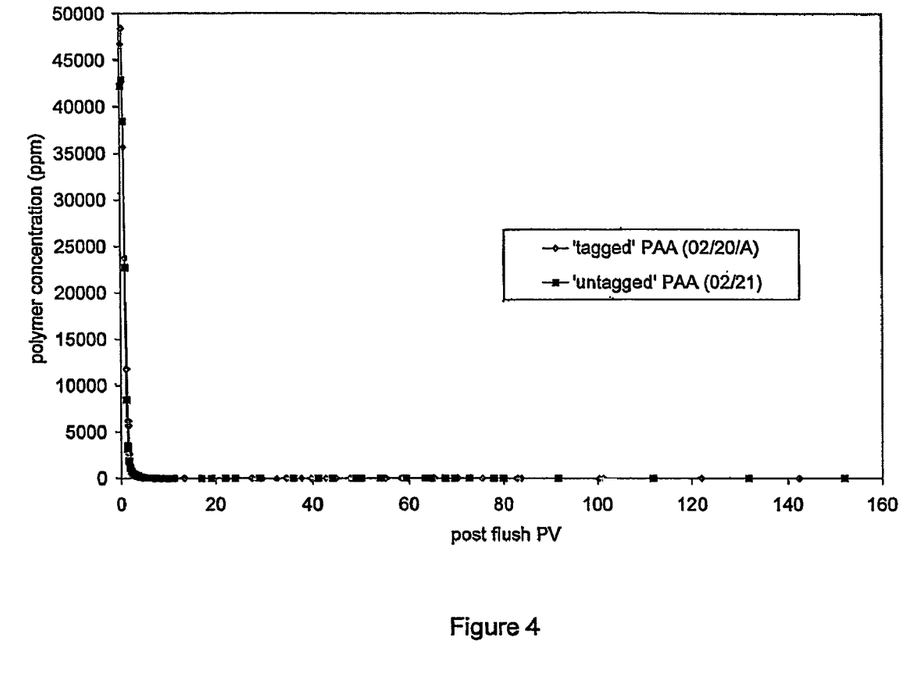
Figure 5:
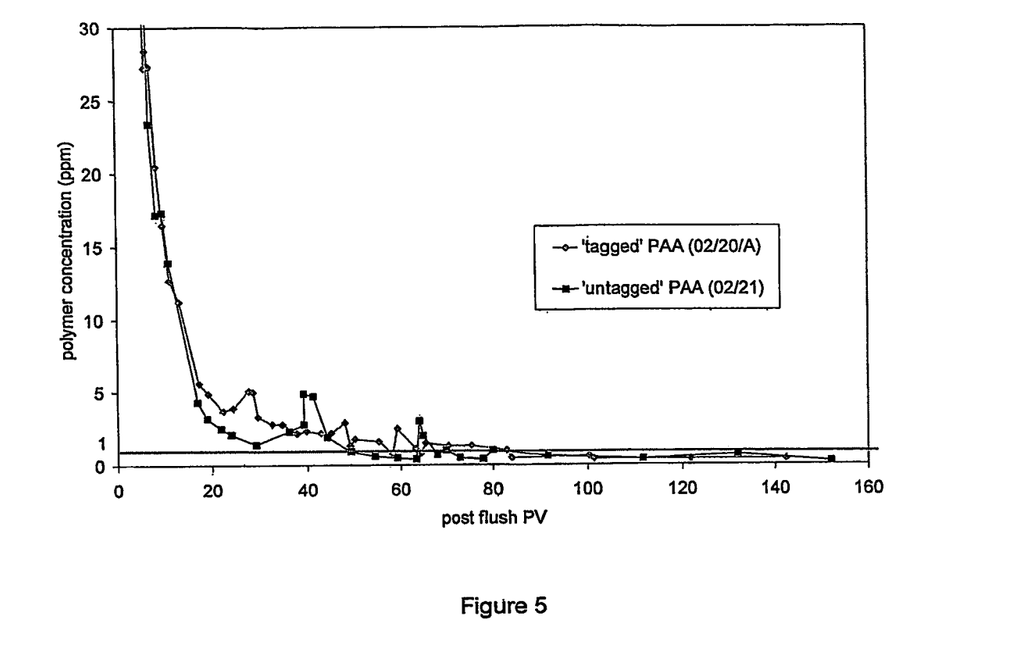

FIGS. 4 and 5 show the inhibitor return profiles, as measured by Hyamine analysis (carried out with removal of the brine salts), for both 9-vinylanthracene 'tagged' and 'untagged' polymer.

Figure 6:
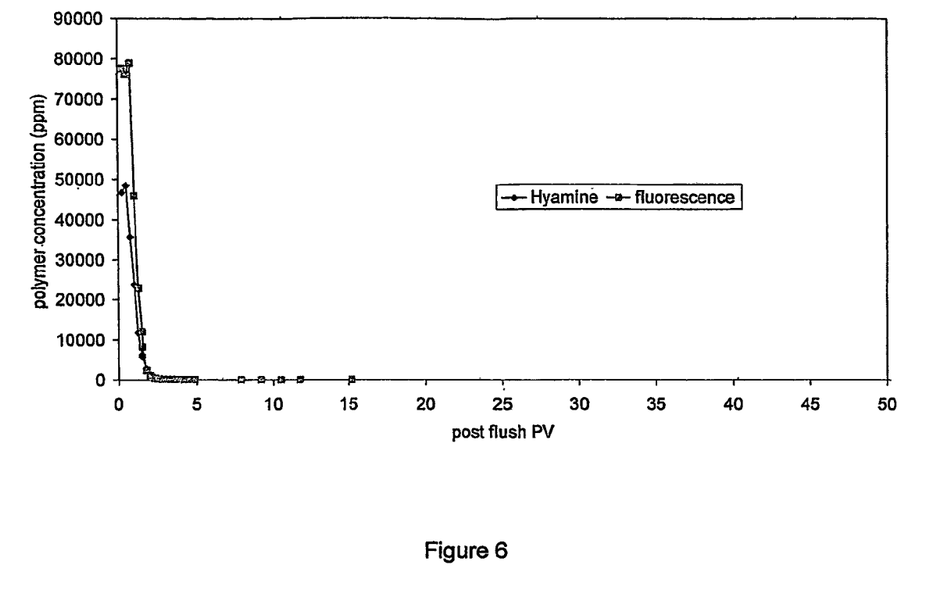
Figure 7:
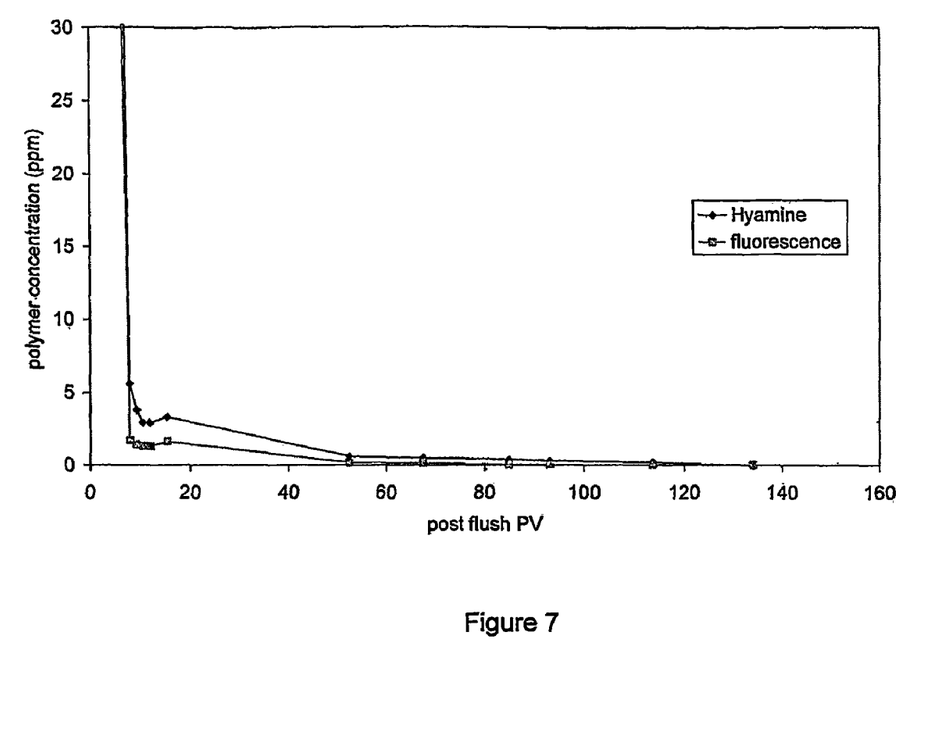

FIGS. 6 and 7 show the 9-vinylanthracene 'tagged' polymer return profiles by Hyamine and fluorescent analysis.

Table 5 below shows the change in brine permeabilities pre- and post-chemical treatment.

TABLE 5

Pre- and post-treatment brine permeabilities for both 9-vinylanthracene 'untagged' and 'tagged' PAA core floods

| Permeability | 'untagged' PAA | 'tagged' PAA |
|---|---|---|
| pre-treatment at 120° C., FF direction | 2234 | 3096 |
| pre-treatment at 120° C., RF direction | 2520 | 3304 |
| post-treatment at 120° C., FF direction | 2340 | 3096 |
| post-treatment at 120° C., RF direction | 2443 | 2890 |
| % recovery @ 120° C., FF direction | 105% | 93% |
| % recovery @ 120° C., RF direction | 97% | 94% |

These results show similar inhibition return profiles for 9-vinylanthravene 'tagged' and 'untagged' polymer. They also show stability of the bond between the 'tag' and polymer backbone—allowing 'tagged' inhibitor monitoring by fluorescence throughout the core flood. In addition no significant change in core brine permeabilities is seen for either 9-vinylanthracene 'tagged' or 'untagged' polymer.

The invention claimed is:

1. A tagged scale-inhibiting polymer comprising scale inhibiting structural units and tagging structural units, wherein the tagging units comprise units formed from a monomer having the following formula:

$$X_2C=CYY',$$

wherein:
the radicals X, which may be identical or different, are each a hydrogen atom, or a $C_1$-$C_4$ alkyl radical,
Y is a hydrogen atom or a $C_1$-$C_4$ alkyl radical,
Y' is a radical having the formula -L-Arom, wherein:
L is a covalent bond or a divalent organic linking group optionally comprising heteroatoms, and
Arom is a group comprising at least two conjugated aromatic rings, said rings comprising conjugated carbon atoms, and optionally nitrogen or oxygen atoms, and, linked to said carbon atoms, hydrogen atoms or said carbon atoms being optionally substituted.

2. A copolymer as defined by claim 1, wherein the tagging units comprise units formed from the monomer having formula $X_2C=CYY'$ and wherein Arom is a group having at least 10 conjugated carbon atoms.

3. A copolymer as defined by claim 2, wherein the conjugated aromatic rings are $C_5$ or $C_6$ rings.

4. A copolymer as defined by claim 1, wherein Arom is an optionally substituted group comprising naphtalene, an anthracene, a pyrene or a phenanthrene moiety.

5. A copolymer as defined by claim 1, wherein L is a covalent bond or a divalent $C_1$-$C_{12}$ alkyl radical, or a group having the formula —O—, —CO—O—, —CO—NH—, —O—CO—.

6. A copolymer as defined by claim 1, wherein the tagging units comprise units formed from vinyl-anthracene.

7. A copolymer as defined by claim 1, wherein the molar amount of tagging units in the copolymer ranges from 0.01 to 10%.

8. A copolymer as defined by claim 1, wherein the scale inhibiting units are formed from monomers selected from the group consisting of:
vinyl sulfonic acid, or vinyl sulfonate salts;
vinyl phosphonic acid, or vinyl phosphonate salts;
acrylic acid, methacrylic acid;
maleic anhydride, maleic acid;
styrene-p-sulfonic acid, or styrene sulfonate salts;
acrylamido-2-methylpropanesulfonic acid (AMPS), and mixtures thereof.

9. A composition comprising the scale-inhibiting copolymer as defined by claim 1.

10. A composition as defined by claim 9, in fluid state.

11. A composition as defined by claim 10, wherein said fluid comprises a scale inhibiting amount of the copolymer.

12. A composition as defined by claim 10, wherein said fluid comprises industrial water systems including boilers, cooling towers, desalination plants, geothermal power production, mineral ore extraction, paper pulping or paper manufacture.

13. A composition as defined by claim 10, wherein said fluid is an oilfield fluid.

14. A composition as defined by claim 13, wherein the fluid is seawater, formation water, produced water, a drilling fluid, a completion fluid, a stimulating fluid, or a squeezing fluid.

15. A method for preventing or controlling scale formation in systems comprising fluid circulation, which comprises the steps of:
(a) adding in the fluid a scale-inhibiting amount of a tagged scale-inhibiting polymer, or forcing a tagged scale-inhibiting polymer into an oilfield wherein the fluid will be circulated,
(b) periodically, continually, or continuously measuring the amount of tags in the fluid, and
(c) periodically, continually, or continuously further adding more tagged scale inhibiting copolymer when the measured amount is below a given value, and/or reforcing the tagged scale inhibiting polymer into the oilfield, wherein the scale-inhibiting copolymer is a tagged scale-inhibiting copolymer as defined by claim 1.

16. The copolymer as defined by claim 2, wherein Arom has at least 14 carbon atoms in at least three conjugated aromatic rings.

17. The composition as defined by claim 11, said fluid comprising 0.1 to 1000 ppm by weight of copolymer.

* * * * *